United States Patent [19]

Greenspan

[11] 4,083,351
[45] Apr. 11, 1978

[54] FLUTED DIAMOND DRILL

[76] Inventor: Harold Jack Greenspan, 5334 Holt Ave., Los Angeles, Calif. 90056

[21] Appl. No.: 760,966

[22] Filed: Jan. 21, 1977

[51] Int. Cl.² .......................................... B28D 5/00
[52] U.S. Cl. ................................ 125/30 R; 51/206 P; 408/145
[58] Field of Search .......... 408/145; 51/209 R, 206 P; 125/30 R, 30 WD; 76/DIG. 12

[56] References Cited

U.S. PATENT DOCUMENTS

| 2,467,596 | 4/1949 | Pratt | 76/DIG. 12 |
| 3,243,924 | 4/1966 | Peters | 51/209 R X |
| 3,382,743 | 5/1968 | Trevathan | 125/20 |
| 3,494,348 | 2/1970 | Lindblad | 51/209 R |
| 3,495,359 | 2/1970 | Smith | 51/209 R |

FOREIGN PATENT DOCUMENTS

| 361,839 | 1973 | U.S.S.R. | 408/145 |

Primary Examiner—Harold D. Whitehead
Attorney, Agent, or Firm—Whann & McManigal

[57] ABSTRACT

A drill for use in drilling precious and semi-precious stones consisting of a body adapted to be rotated on its axis, said body having longitudinal cutter elements separated by longitudinal flutes, the surfaces of the body of said drill being covered by an abrasive layer consisting of a ductile metal, such as nickel, containing a multiplicity of abrasive particles.

5 Claims, 8 Drawing Figures

FLUTED DIAMOND DRILL

THE PRIOR ART

It is present practice to drill precious or semiprecious stones by means of diamond drills ranging from ⅜ths to 3½MM O.D. The body of the drill is formed of steel, such as music wire, and is plated with a layer of diamond particles ranging from 140 to 100 grit. The end or tip of the music wire body is flat and has a circumferential edge with a slight radius. Such drills have a relatively short life and the initial breakdown occurs on the circumferential edge, and when the diamond particles are worn away from this edge the drill ceases to function. Also, very often the abrasive layer will separate from the music wire base material and come off as a cap. This failure is a function of poor or marginal plating adhesion.

SUMMARY OF THE INVENTION

It is an object of my invention to provide a diamond or abrasive drill for use in drilling small holes such, for example, as 50-thousandths of an inch, which has a longer cutting life and cuts faster than diamond drills on the market today.

It is an object of my invention to provide a diamond drill of the character described having longitudinal flutes between cutter elements, the flutes being used to flush away the drilled material.

It is also an object of my invention to provide a diamond drill of the class described in which the drill, even though it is of very small size, has a plurality of leading cutter edges which cut at the bottom of the hole being drilled and which cut more efficiently and retain their form for longer periods of time than other drills of this size.

It is another object of my invention to provide an abrasive drill of the character described in which the cutting surfaces and the cutter edges are formed so that as the old abrasive particles are worn or broken away new abrasive particles are continually brought into working position and the drill will, therefore, continue to operate efficiently and cut to size over a longer period of time than is possible with drills on the market today.

Other objects and advantages of my invention will be made evident in the course of the following detailed description of my invention.

DESCRIPTION OF THE PREFERRED EMBODIMENT

Figure 1:
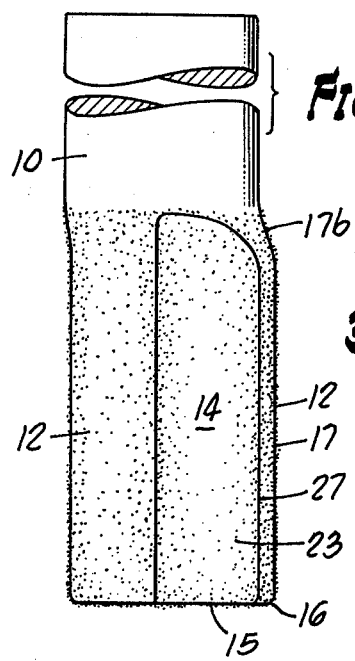
FIG. 1 is an elevational view of the drill incorporating my invention.
Figure 2:
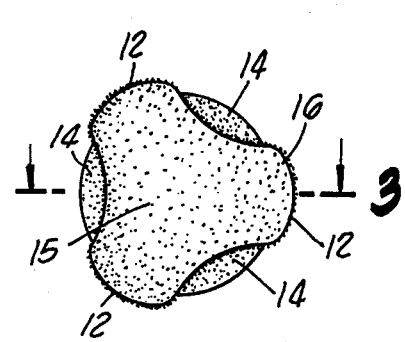
FIG. 2 is a bottom plan view of FIG. 1.

The drill of my invention provides a shank 10, the upper portion of which is adapted to be mounted or secured in a rotating power tool. The lower drilling end of the drill is in the form of a steel body 11. The body 11 has longitudinal cutter elements or lobes 12 which are equally spaced around the circumference, the lobes 12 being separated by longitudinal flutes 14. Also, the body 11 has a bottom wall 15 which is preferably flat but is slightly rounded where the different cutter edges meet as shown at 16.

The drill which I have chosen for the purposes of illustrating my invention is intended to drill a fifty thousandths of an inch hole. The body is formed from a piece of cylindrical music wire rod which is upset in such a way that the metal at the drill tip is formed into the cutter elements and the flutes.

Figure 7:
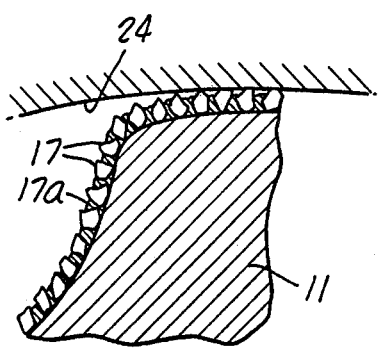
FIG. 7 is an enlarged fragmentary sectional view showing the manner in which the coating or layer of abrasive material is applied to the body of the drill.
Figure 8:
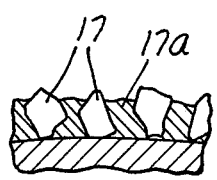
FIG. 8 is a fragmentary view on a considerably enlarged scale showing the manner in which the coating or layer of nickel holds the diamond particles in place.

All of the surfaces of the body are covered with a layer of abrasive particles 17 and as shown in the much enlarged FIG. 7, these abrasive particles are held in place by a nickel layer or plating 17a or coating applied to the body 11, the nickel layer holding abrasive particles 17a on the surface and embedded in it as shown best in FIG. 8.

Figure 3:
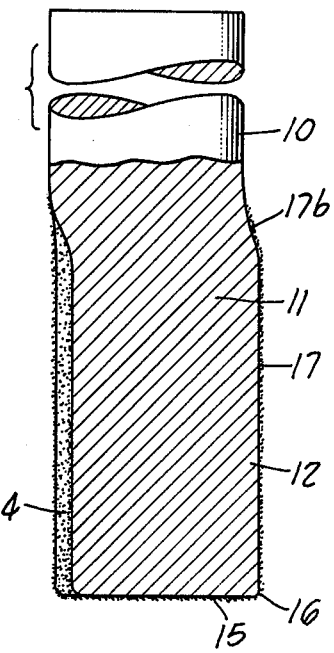
FIG. 3 is a vertical sectional view taken along the line 3—3 of FIG. 2.

The abrasive coating covers the entire body, even areas or locations where no drilling operation or function is performed. The nickel layer formed around the noncutting portions of the cutter elements and flutes locks the nickel layer or plating from circumferential spin-out. Also, the layer of abrasive material at 17b, as shown in FIG. 3, locks the plating from axial pull out.

Figure 4:
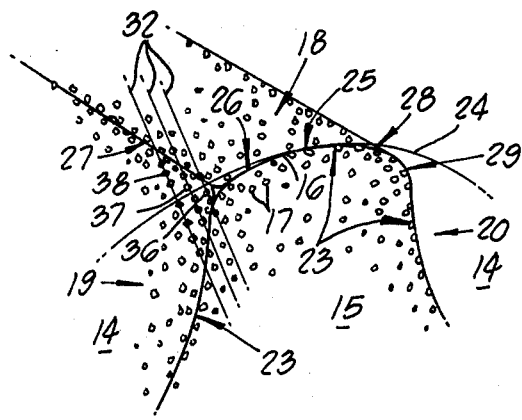
FIG. 4 is a perspective view taken from the bottom of the drill showing the manner in which the various cutting edges meet.

As shown in FIG. 4, each of the cutter elements or lobes has an outer wall 18 which extends longitudinally of the body of the drill. Also, each cutter element has a forward side wall 19 and a trailing or following side wall 20 which extends inwardly to form the separating flutes. The outer wall and side walls 18, 19 and 20 meet with the bottom wall 15 to form a bottom cutter edge 23. The line 24 represents the wall of the hole being drilled, and it will be noted that the shape of the lobe is such that the outer wall 18 of each cutter has a portion 25 which is on the full diameter of the hole which is drilled. The forward longitudinal portion 26 of each wall 18 curves inwardly to the meeting line or longitudinal cutter edge 27 between the outer wall and the forward wall 19. The trailing portion 28 also curves inwardly and meets the trailing wall 20 at 29. The leading edges of each of the three cutter elements 23 each cut on the bottom of the hole.

When the drill is in operation the exposed abrasive particles at the cutter edges start to wear or break loose, and in my invention as the particles start to wear and are removed from position new particles move into cutting position and the drill will continue to cut. The abrasive material or layer includes diamond particles in the range of 140 to 100 grit and as the diamond particles are removed from place the new cutter edge is as efficient as the original cutter edge.

The greatest wear occurs at the slightly rounded corners 16 where the bottom surface joins to the outer surfaces 18 of each of the cutter elements 12. FIG. 4 shows a perspective view of one of the cutter elements when the drill is new. As the bit is fed into the stone or other material to be cut the abrasive particles 17 on the bottom 15 start cutting and the drill advances into the material being cut. As stated heretofore, most of the wear occurs at the rounded corner 16 and the wearing action takes place along diagonal lines, such as the lines 32 in FIG. 4. The three diagonal lines are intended to illustrate how the rounded corner progressively wears away.

Figure 5:
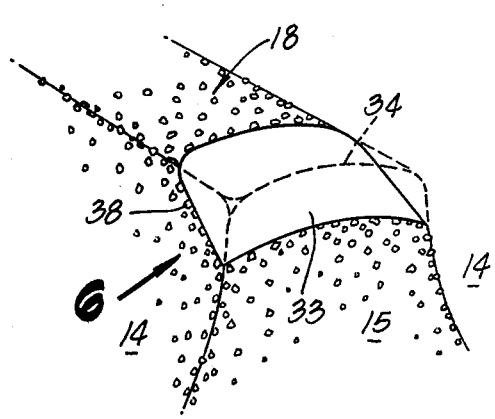
FIG. 5 is a perspective view similar to FIG. 4 but showing the lower end of the drill after it has been in use for a period of time and illustrating the manner in which the lower ends of the cutter elements are worn away into a taper and showing the manner in which new abrasive particles are brought into working position in order to continue to perform the drilling operation.
Figure 6:
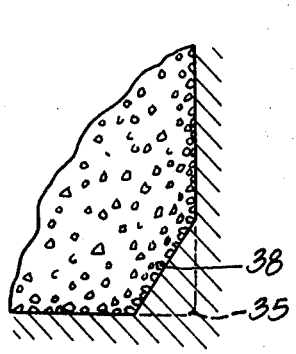
FIG. 6 is a fragmentary view of the lower end of the drill taken in the direction of the arrow 6 in FIG. 5 and showing the newly formed leading cutter edge.

In FIGS. 5 and 6 the lower corners of the cutter elements of the drill are shown worn away to form each of the cutter elements with diagonal or tapered walls 33. In FIG. 5 broken lines 34 illustrate the original shape of the rounded corner and broken lines 35 in FIG. 6 show the original shape of the rounded corners.

As previously explained all of the surfaces are covered with the layer of nickel 17a which secures the diamond particles 17 on all of these surfaces. When the corner starts to wear the diagonal or tapered corner portion will be formed as illustrated by the diagonal lines 32 and it will be noted that irrespective of how much wear has occurred at the corners, fresh diamond particles are brought into cutting position. For example, in FIG. 4, when the corner has worn to the first line 32, particles 36 are brought into cutting position. When the corner wears to the second line particles 37 are brought into cutting position, and when the corners wear to the third diagonal line 32, fresh particles 38 are brought into cutting position.

By applicant's unique arrangement the wearing away of the corner does not affect the cutting ability of the drill because the fresh diamond particles are brought into cutting position and these fresh diamonds operate as effectively as do the diamond particles which are in cutting position when the drill is new. Because new abrasive or diamond particles are continually brought into cutting position and presented to the object being drilled, the cutting efficiency of the drill remains relatively high even after extended periods of use.

If the corners were worn away into a different taper or conical shape, as shown in FIGS. 4 and 5, fresh abrasive particles would nevertheless be brought into cutting position and efficient cutting would be maintained.

In the drill herein illustrated the diameter on which the surfaces 25 are placed is 0.050 inches. The diameter of the shank of the drill is 0.032 inches and the lobes 0.038 inches. The layer of abrasive material is 0.006 inches thick. Thus, the drill's full diameter is 0.050 inches.

Obviously these dimensions may be changed and drills of different sizes may be built incorporating the features of my invention. It is obvious that small variations in sizes or shapes or proportions may be made without departing from the spirit and the scope of the invention.

I claim:

1. An abrasive drill for cutting a cylindrical hole in which the drilling operation is performed by abrasive particles secured to the drill body, the combination of:
   (a) a solid body adapted to be rotated along its axis, said body having formed integrally therewith a plurality of cutter elements;
   (b) each cutter element having a bottom cutter surface and longitudinal cutter surfaces meeting in leading cutter edges with respect to the direction of rotation of the drill, said leading cutter edges cutting the surface of the material to be drilled, said bottom cutter surfaces combining to form a full diameter cutting surface which cuts the entire diameter of the bottom of the cylindrical hole being cut; and
   (c) a layer of abrasive particles bonded to said cutter surfaces, whereby when wear occurs new abrasive particles are continually brought into working position and the drill will continue to function.

2. An abrasive drill for cutting a cylindrical hole in which the drilling operation is performed by abrasive particles secured to the drill body, the combination of:
   (a) a solid body adapted to be rotated along its axis, said body having a plurality of cutter elements and a bottom cutter surface extending over the full diameter of said body and cutting the entire bottom wall of the cylindrical hole being cut, said bottom cutter surface forming bottom cutter surfaces for each cutter element;
   (b) longitudinal cutter surfaces on said cutter elements, said longitudinal cutter surfaces meeting with said bottom cutter surfaces to form leading cutter edges with respect to the direction of rotation of the drill, said leading cutter edges cutting the surface of the material to be drilled; and
   (c) a layer of abrasive particles bonded to said surfaces and when the drill is new said abrasive particles are positioned along said leading cutter edges, said abrasive diamond particles being positioned so that when the juncture between said bottom cutter surface and said longitudinal cutter surfaces wear away into a taper, fresh abrasive particles are brought into operating position along the newly formed cutter edge in order that the drilling operation may continue.

3. A combination as defined in claim 1 in which the outer longitudinal cutter surfaces of said cutter elements are formed on a curvature of less radius than the radius of the hole being drilled.

4. A small diametered abrasive drill for cutting cylindrical holes of not more than 3 mm in diameter in which the drilling operation is performed by abrasive particles secured to the drill body when the drill is rotated, said abrasive drill comprising:
   (a) a shank portion;
   (b) a solid body joined to said shank portion having a plurality of integral longitudinal cutter elements separated by flutes formed by deforming said solid body, said longitudinal cutter elements having outer portions on a larger diameter than said shank, and said flutes having portions which are positioned of a smaller diameter than the diameter of said shank, said body having a full diametered bottom cutter surface which is the full diameter of said body and cuts on the full diameter of the cylindrical hole being drilled;
   (c) each cutter element having outer longitudinal cutting surfaces and a leading cutter surface said outer cutter surface and said leading cutter surface meeting to form a leading cutting edge and in which said leading cutter surface and said full diametered bottom cutter surface also meeting in a leading cutter edge; and (d) a layer of abrasive particles bonded to all of said cutter surfaces whereby said drill cuts the full diameter of said cylindrical hole being drilled, and which when the drill is new said abrasive particles are positioned along said leading cutting edges, said abrasive particles being so positioned that when the leading cutter edges are worn away fresh abrasive particles are brought into operating position along newly forming leading cutter edges in order that drilling operations may continue.

5. A drill as defined in claim 4 in which the abrasive particles are secured to the body of the drill including the cutting elements and flutes by means of plating attached to the cutting and non-cutting surfaces of the body so that the plating is mechanically locked to the body and parts thereof, both in a direction of rotation of the drill to prevent circumferential spin-off and also in an axial direction.

* * * * *